United States Patent

[11] 3,595,586

| [72] | Inventor | William R. Anderson |
| | | Perrysburg, Ohio |
| [21] | Appl. No. | 856,583 |
| [22] | Filed | Sept. 10, 1969 |
| [45] | Patented | July 27, 1971 |
| [73] | Assignee | Anderson Associates Inc. |
| | | Toledo, Ohio |

[54] LUBRICANT SEAL FOR MAKING CYLINDRICAL OBJECTS
9 Claims, 3 Drawing Figs.

[52] U.S. Cl. ............................................. 277/164
[51] Int. Cl. ............................................. F16j 15/32
[50] Field of Search............................... 277/164, 153, 212, 165; 29/453

[56] References Cited
UNITED STATES PATENTS
3,218,692  11/1965  Kayser........................ 29/453

FOREIGN PATENTS
80,615  6/1951  Czechoslovakia.......... 277/164

*Primary Examiner*—Robert I. Smith
*Attorney*—Wilson & Fraser

ABSTRACT: A seal between two relatively movable, telescopically interfitting cylindrical elements comprising a body of elastomer having a first flange embracing the outer surface of the inner element, a second flange embracing the outer surface of the outer element, and a helical spring having its convolutions closed upon itself and embedded in the elastomer in one of the flanges with the innermost portion of the convolutions exposed to engage the embraced cylindrical element. The seal has been applied to relatively rotating, right circular, cylinders such as the trunnions and bearing races of cardan-type universal joints as a grease seal and needle-bearing retainer.

PATENTED JUL27 1971 3,595,586

INVENTOR.
WILLIAM R. ANDERSON
BY
Wilson & Fraser
ATTORNEYS 3,595,586

LUBRICANT SEAL FOR MAKING CYLINDRICAL OBJECTS

This invention relates to seals for the junctures between telescopically interfitting, relatively movable, cylinders and more particularly to an elastomeric body which retards the escape of fluids from between such cylinders while permitting relative motion therebetween.

In a preferred embodiment of the invention it is disclosed as applied to a cardan-type universal joint wherein a helical spring of the type generally identified as a garter spring is embedded in the annular body of elastomeric material in an arrangement to engage a cylinder such as a trunnion or bearing race and grip that cylinder by compression thereon, whereby the body effectively seals against the undesirable loss of lubricant from the bearing without undue frictional drag and while accommodating the usual encountered manufacturing tolerances.

In the usual construction of a cardan-type universal joint, there is a pair of drive shaft members capable of rotation, the ends of which are in a juxtaposed relationship. The ends of each of the two drive shaft members usually have a pair of lug members disposed in a parallel manner in the form of a yoke extension and these ends are connected together in a torque-transmitting relationship by articulating means such as a journal crossmember. The journal crossmember is drivingly secured to each such drive shaft member so as to allow angular displacement of the axes of the drive shaft members relative to each other during the transfer of torque therebetween, thereby providing a universal joint connection between these respective drive shaft members.

In the usual construction of the journal crossmember of the universal joint, there are four radially spaced arms, the end of which are commonly called trunnions. These four arms are generally spaced 90° from one another in a uniplanar relationship. The trunnion ends normally are fitted into cup-shaped bearing races, which in turn are fitted into appropriate openings in the yoke extensions of the respective drive shaft members. The inner surfaces of the bearing race provide a bearing surface against which the respective trunnions react through intermediately disposed needle bearings.

In the usual structural arrangement of a cardan-type universal joint, there is an annular trunnion seal disposed around each of the individual trunnion arms, which seal serves to retain essential lubricant in the bearing spaced between the trunnion arm and the bearing race area. In general, these trunnion seals are composed of an elastomeric material, and frequently there is also provided in conjunction therewith an annular retaining member in the form of a metallic ring frequently bonded or molded to some portion of the outer radial periphery of the elastomeric portion of the seal. In some instances, the annular retaining member is molded into the center of the elastomeric member, so as to be positioned completely within the elastomeric member around its entire circumferential extent.

Additionally, several universal joint seals incorporate an annular bead constituted of elastomeric material and which is formed from a portion of one of the lip extensions of the elastomeric member itself; this bead serves to grasp a portion of the outer surface of the bearing race for biasing the entire seal radially inwardly. The purported function of these peripherally disposed metallic rings or beads, as the case may be, is to aid in pressing the elastomeric annular member radially inwardly towards the trunnion member and bearing race member in order to effect a more otpimal sealing fit.

In a few other types of trunnion seals, various unique configurations in the elastomeric member itself have been utilized without the aid of additional retaining means for providing the required radially inward bias. In each case, however, the primary objective is to provide an optimal sealing fit, which is not too tight nor is too loose. If too tight a fit is encountered, there is no way to flush out old lubricant from the spaced between the trunnion and bearing race, and the seal becomes worn more readily. If too loose a fit is encountered, the seal is obviously not capable of performing its intended function. More specifically, if the compression urged inwardly by the seal on the trunnion is too great, the elastomeric material on the seal will quickly wear out because of the excessive friction. Excessive compression will also prevent bleedoff of old lubricant for purposes of relubricating the bearing race. On the other hand, if the compression is not strong enough it will not provide a sufficient seal for the space between the exterior of the trunnion and the inner surface of the bearing race member.

Prior to this invention, there has been no seal known which had provided the critical optimum sealing relationship between the trunnion and the bearing race member on a cardan-type universal joint. One of the main reasons such an optimum sealing relationship could not be effected is that external peripheral or internally located metallic bands on or in the seal have not been the most efficient means for imparting this necessary optimum bias. Nor have beaded flanges proven efficient and fully effective for the purpose of imparting this bias.

In view of the problems herein discussed, it is an object of this invention to improve seals between relatively movable, telescopically interfitted cylindrical members.

It is a further object of this invention to optimize the sealing engagement of two telescopically interfitted, relatively rotating, right circular cylinders to retain lubricant between the cylinders without undue drag and wear.

Another object is to avoid adverse effects of external forces on a seal subjected to such forces.

Still another object of this invention is to encompass the spacing between relatively movable bodies with a unitary structure.

It is also an object of this invention to facilitate the installation and removal of seals between relatively movable cylinders.

Still another object of this invention is to increase the life and efficiency of a cardan-type universal joint.

Yet another object of this invention is to accommodate and readily adjust to relative movement between relatively movable cylinders.

It is also an object of this invention to accommodate tolerance variations between relatively movable cylinders.

These and other objects of this invention will be evident from the following description and the accompanying drawings, in which.

Figure 1:
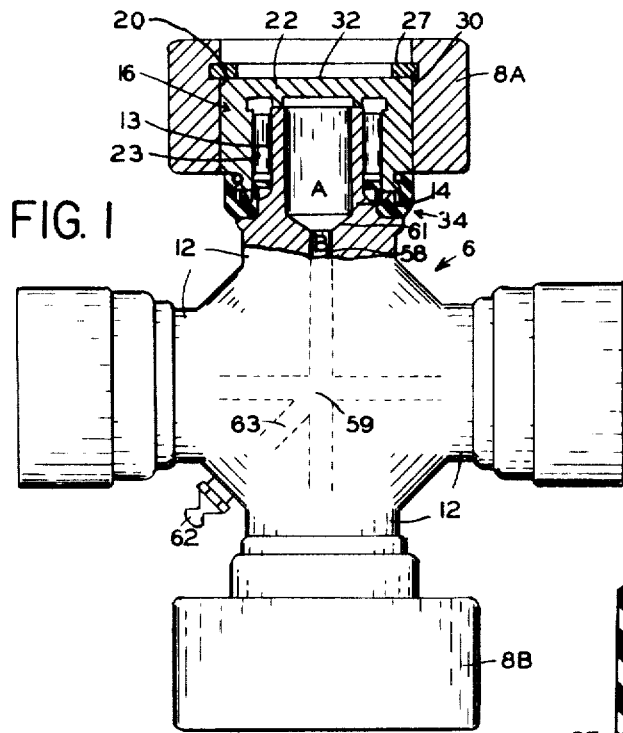
FIG. 1 is a front elevational view partially in section of a journal cross for a cardan-type universal joint incorporating this invention.
Figure 3:
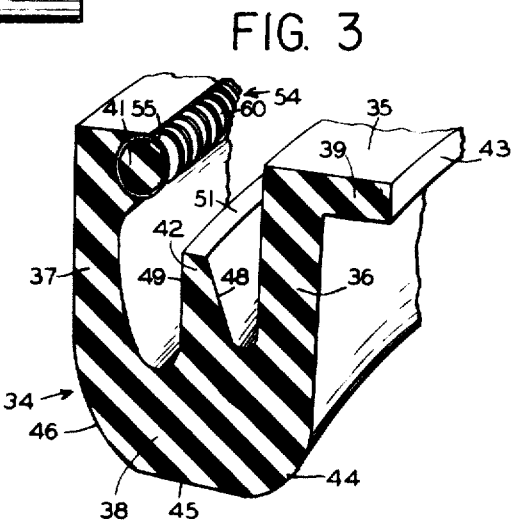
FIG. 3 is a perspective view, partially in section, of the trunnion seal shown in FIG. 1.
Figure 2:
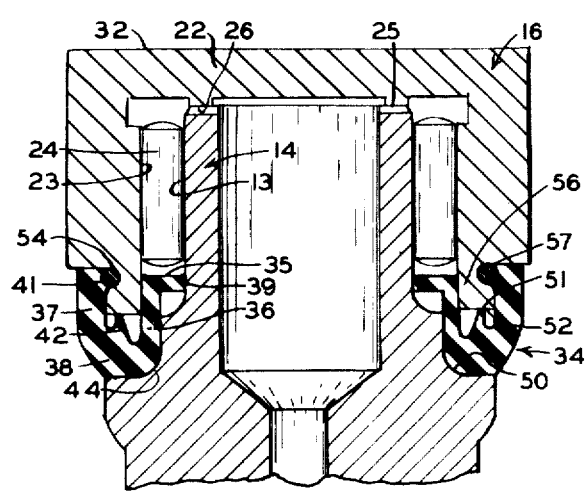
FIG. 2 is an enlarged view in fragmentary section of the trunnion section shown in FIG. 1.

In the terminology of this specification and the claims appended hereto, the words "radial" and "axial" will be used, and for this purpose, the word "axial" shall be used in reference to the respective axes of rotation of the individual journal crossarms on the journal cross connecting the yoke arm members from the adjoining drive shafts; and the term "radial" shall be construed as a direction extending perpendicular relative to such respective axes of rotation, unless such terms are specifically defined otherwise. Additionally, the word "inner" shall be construed to refer to the middle portion of the journal cross where the journal crossarms intersect, while the word "outer" shall refer to a direction extending towards the extreme ends of the individual journal crossarms.

In general, in a preferred embodiment of the subject invention, the journal cross of a cardan-type universal joint has four radially extending arms which are equally spaced relative to one another in a common plane. AT the end of each journal crossarm there is a portion thereof commonly called a trunnion which has a bearing surface on the outer surface portions thereof, and each trunnion is adapted to fit into a cup-shaped bearing race member containing an annulus of needle bearings. The bearing race is in turn fixedly secured in an opening in one of the yoke arms extending from the end of a rotatable drive shaft. The individual trunnion is, as a consequence, mounted in the bearing race so as to be rotatable relative thereto.

Each journal crossarm has an internal lubrication channel which extends axially throughout the entire length of the arm from a lubrication reservoir in a central cavity in the journal cross to an opening in the outer end of the journal crossarm. This lubrication reservoir serves each of the four lubrication channels extending through the four respective journal arms. Leading from the lubrication reservoir to the exterior of the journal cross at the intersection of the arms is a channel connecting an opening, generally equipped with a zerk fitting for adding lubricant to the reservoir reservoir.

Interposed between the open end of the bearing race and the trunnion portion of the journal crossarm is a sealing mechanism embodied in the form of an annular resilient elastomeric member having multiple annular flange portion which pressingly engage a portion of the respective trunnion circumference surfaces of the respective bearing race. Integrally molded into this annular elastomeric member is an annular coil-type tension spring which serves to provide the necessary bias on the elastomeric member for optimal sealing pressure on the trunnion and bearing race and optimal interfacial lubricant sealing relationships with the trunnion and bearing race.

The annular helical spring molded into the body of the elastomeric member serves as a biasing member urging the annular elastomeric member radially inwardly toward the exterior surface of the bearing race and indirectly toward the trunnion member. Exposed outer portions of the convolutions of the helix engage the cylindrical surface they embrace to define a parallel array of fine passages generally paralleling the longitudinal axis of the cylinder along which spent lubricant can be ejected without admitting foreign matter. Other purposes in molding the spring with the elastomeric member are to enable the spring to impart its radial tension more fully to the elastomeric member, and also to provide the necessary flexibility to the annular elastomeric member for adapting to changes of sealing pressure requirements, which may arise from tolerance variations which accumulate between the bearing race and trunnion members. In molding the annular garter spring to the elastomeric member in this invention the spring is extended slightly in tension on a portion of the mold to open its interstices for the admission of the fluid molding compound into its interstices.

Referring now to the drawings in which a preferred embodiment is set forth, a journal cross for a cardan-type universal joint is shown, in FIG. 1, at 6, and shown at 8A and 8B is a pair of yoke arm extensions from a drive shaft member (not shown), to be connected through the universal joint connection to another drive shaft member. The journal cross 6 is adapted to drivingly connect to the respective pairs of yoke arm extensions on opposing drive shaft members, and, consequently, the joint can accommodate misalignment of the respective drive shaft members for a universal joint connection.

Journal cross 6 has four radially extending arms 12 which have straight axes, and which are equally spaced from one another in a paired opposing relationship. These arms 12 are all disposed in the same plane, and as a consequence, the journal crossarm 12 has a bearing surface 13 machined on the external area of its axially outer portion. This bearing surface portion of the journal crossarm forms a trunnion 14, and is adapted to fit into a cup-shaped bearing race 16. The bearing race 16 includes an external annular wall portion 20 and is closed at its axially outer end by a transverse wall portion 22. In addition, the bearing race 16 has an internal circumferential wall portion 23 which is machined smoothly as a bearing surface. Disposed between the internal wall straight 23 of bearing race 16 and the bearing surface 13 of trunnion 14 is an annular array of needle bearings 24, which provide relatively low friction rotation between the trunnion and the bearing race. The axially outer end of trunnion 14 is terminated by a transversely extending and axially outwardly facing thrust surface 25 which is disposed in a cooperative relationship with a thrust surface formed on the axially inner surface 26 of the transverse wall 22 of the bearing race 16. The usual mode of securing the bearing race against axially outward movement relative to lug 8 is a conventional snap ring 27 positioned in an annular groove 30 machined into the axially outer portion of each opening in lug 8. Snap ring 27 abuttingly engages the axially outer face 32 of the bearing cup 16.

An annular seal element 34 closes the space between inner cylinder 14, the trunnion, and outer cylinder 16, the bearing race, and provides a retainer ring 35 preventing the axial displacement of bearings 24 from between the trunnion and race. Seal 34 advantageously is of an elastomer such as polyurethane formulated so that the resultant body when injection molded has about an 80 Shore durometer, one resin providing these characteristics is Mobay Texin 591A obtained from Mobay Chemical Co., Pittsburgh, Pa. 15205. Seal 34 includes a pair of spaced cylindrical walls 36 and 37 respectively encompassing a portion of the trunnion 14 and race 16 and an intermediate body portion 38. Flanges 39, 41 and 42 extend from walls 36 and 37 and body 38 respectively to engage trunnion 14 and race 16 respectively.

Flange 39 extends radially inwardly from wall 36 to a cylindrical face 43 which abuts trunnion 14 to form bearing retainer surface 35 and to provide a sliding and lubricant sealing fit therewith. Face 43 defines an open inner portion of the seal accommodating trunnion 14. Wall 36 extends coaxial of trunnion 14 and merges with body portion 38 which on its exterior turns 90° on a radius 44 to a surface 45 extending radially outward from trunnion 14. A portion of the inner surface of wall 36 and radius portion 44 engages a conforming machined region 50 at the root of trunnion 14 to further seal the path along the trunnion.

The external surface of wall 37 merges with the radial surface 45 of body portion 38 on a radius 46 larger than radius 44 and extending over an arc of substantially 60°. The internal configuration of body portion 38 includes an annular flange 42 generally paralleling walls 36 and 37. Flange 42 functions as a one-way flap valve for lubricant. It has a cross section of a truncated right triangle wherein the hypotenuse 48 provides a face which is reentrant with respect to wall 36 and which is inclined outwardly of wall 36. The opposite side 49 of the triangular cross section generally parallels wall 36. Triangle sides 48 and 49 are truncated to an annular face 51 normal to the longitudinal axes of the cylinders 14 and 16 and walls 36 and 37. Sealing and valving is accomplished by flange 42 by virtue of its resilience and its spatial relationship with the end of the cylindrical wall of bearing race 16 such that normally abuts that wall. Pressure builds up in the region of the bearings 24 as new lubricant is introduce and tends to be distributed uniformly within the bearing cavity. Lubricant flow along the trunnion 16 is blocked by flange 39 and the wide area of engagement of radius 44 with trunnion surface 50. Flow along the inner face of race 16 is blocked to a lesser degree by the abutment of the end of the outer surface of wall 36 with the end of the inner surface 23, by flap valve flange 42 and the area of engagement of the outer surface of race 16 by the inner surface of wall 37 and flange 41. Thus a portion of the lubricant is expelled along trunnion 14 to flush the area of engagement of surfaces 13 and 43 while another portion is flushed past flange 42 by the outward displacement of the flange.

In operation centrifugal force is also effective to tend to carry lubricant to the bearing face 23 of race 16, around end 52 past flange 42 and along the inner face of wall 37 to the exterior. Flow along this path is retarded by the engagement of flange 41 extending inwardly from wall 37 to engage an outer surface of race 16.

Flange 53 comprises a helical spring 54 made up of a series of convolutions 55 closed upon themselves in a form sometimes designated a garter spring. This spring is embedded in the elastomer of the seal by expanding it on a mandrel in the seal mold (not shown) to open its convolutions and admit molding compound to its interstices. When released from the mold, it tends to contract thereby offering a compressive bias to the distal portion of wall 37. Race 16 is provided with a reduced outer diameter region 56 at its open end an an undercut circumferential groove 57 to receive and accommodate spring 54. The minimum diameter of the groove 57 and the inner diameter of annular spring 54 are so related that the spring is in tension when the seal is in place on race 16 and the spring thereby imposes a bias radially inward over the circumference of the race which it embraces. This bias further retards the flow of lubricant outwardly from the bearing.

The innermost portion of each convolution 55 of the spring 54 is free of the molded elastomer and is exposed and is exposed over about one-half of the convolution. Thus, in the case of a metal helix 54 and a metal bearing race 16 a metal-to-metal contact is provided between the flange portion of helix 54 and race 16 which results sin an array of narrow passages 60 generally parallel to each other and the longitudinal axes of the cylinders. The passages have been found to offer enhanced lubricant flushing without reverse lubricant flow into the bearing and improve the lie of the bearing. Further, since the major movement of the seal 34 relative to the relatively rotatable trunnion 14 and race 16 is with respect to the race, the interstitial passages 60 maintains lubricant over the region of high spring pressure to minimize wear.

The lubrication and sealing system in the preferred embodiment of the subject invention includes in each journal crossarm 12 an internal lubrication channel 58 which extends through the complete axial extent of the journal crossarm from the axially outer extremity 25 of the journal crossarm 12 to a cavity 59 located in the middle of the journal cross 6. Each lubrication channel 58 is axially aligned with the corresponding lubrication channel for the paired opposed journal crossarm 12. The four lubrication channels 58 for the four individual journal crossarms 12 intersect in the central cavity 59, this cavity 59 serving as a lubrication reservoir. Each lubrication channel is enlarged in diameter relative to the other other portions in the area of the trunnion, there being a tapered bore section 61 leading from the smaller diameter section B of the lubrication channel 58 to the larger diameter section A of the trunnion area. Lubricant is fed to cavity 59 through zerk fitting 62 by way of channel 63, and is then directed from cavity 59 to the channels 58.

Lubricant leading from respective lubrication channels 58 is directed generally to the space between the individual trunnions and bearing races containing the needle bearings 24. Seal 34 serves to retain this lubricant between the trunnion surface 14 and the bearing race 16; and also functions to prevent the ingress of contaminants into this same area. A third function of seal 34 is to cause lubricant spin-off, that is, the ejection of useless lubricant. These functions will be more fully described subsequently.

The garter spring 54 becomes integrally coextensive with the seal 34, and being so coextensively cooperative, functions more substantially and effectively in helping the seal 34 provide a more optimal sealing contact. Specifically, garter spring 54 tends to have compressive force characteristics, and this compressive force of spring 54 will urge flange 41 radially inwardly to provide seal 34 with a circumferentially uniform and firmer sealing relationship against the external surface of the bearing race. Frequently, this enhanced compressive force of the integral spring 54 permits the present seal to be employed in areas where the prior art devices having only elastomeric walls to provide such force required wall thickness so great that they cold not be fitted into the area.

While the seal of this invention has been disclosed as applied to the junction between a trunnion and bearing race of a universal joint, it is to be understood that it is applicable to joints between other telescoped cylindrical members which need not be relatively rotatable, but rather could reciprocate.

Further, the joined members need not be circular cylinders and could be reciprocating polygons telescoped within each other. The helical spring embedded in elastomer might be employed with either or both flanges engaging the external cylindrical walls of the jointed members to which the seal is applied. Further, while the seal is shown as of a general W-shaped cross section where the cylinder embracing walls 36 and 37 extend in the same direction from the joining body portion 38 the advantages of the integrated elastomer and helical spring flange can be realized where the walls extend from the body portion in opposite directions. Accordingly, it is to be understood that the preceding description is ro be read as illustrative and not in a limiting sense.

I claim:

1. A seal between two relatively movable telescopically interfitting, cylindrical elements comprising a body of an elastomer; a first internal flange on said body defining an interior opening of a form adapted to accommodate and engage along a path closed upon itself the exterior of the innermost of said cylindrical elements in the dimension normal to its longitudinal axis; a second flange on said body spaced outwardly with respect to said internal flange and adapted to encompass and conform to an end portion of the exterior of the outermost of said cylindrical elements in the dimension normal to its longitudinal axis along a path closed upon itself; and a helical spring, having a series of convolutions and closed upon itself, partially embedded in said elastomer of one flange over the entire region of the closed path of said flange thereby exposing portions of the convolutions of said spring adapted to intermittently engage the exterior of the respective one of said cylindrical elements associated with said flange.

2. A combination according to claim 1 including a third flange extending from said body and adapted to engage one of said cylindrical elements along a path closed upon itself and intermediate said first and second flanges.

3. A combination according to claim 2 wherein said third flange has a face which is inclined to form an obtuse angle with the portion of said seal body which it is mounted on the side most proximate said first flange and has a face generally perpendicular to the portion of said seal body upon which it is mounted on the side most remote from said first flange whereby said third flange deflects more readily to pressures imposed upon said inclined face than to pressures imposed upon said generally perpendicular face.

4. A combination according to claim 1 wherein said cylindrical elements are of circular cross section and said seal body is annular.

5. A seal between two relatively movable telescopically interfitting cylindrical elements comprising a body of an elastomer; a first internal flange on said body defining an interior opening of a form adapted to accommodate and engage along a path closed upon itself the exterior of the innermost of said cylindrical elements in the dimension normal to its longitudinal axis; a second flange on said body spaced outwardly with respect to said internal flange and adapted to encompass and conform to an end portion of the exterior of the outermost of said cylindrical elements in the dimension normal to its longitudinal axis along a path closed upon itself; a helical spring having a series of convolutions and closed upon itself integral with one of said flange over the entire region of the closed path of said flange; a first cylindrical wall of said seal body encompassing a portion of said first cylindrical element and from which said first flange extends radially inward to said first cylindrical element; and a second cylindrical wall of said body encompassing portions of said first cylindrical wall and said second cylindrical element and from which said second flange extends radially inward to said second cylindrical element.

6. A combination according to claim 5 including a base region of said body extending radially away from said first cylindrical element and joining said first and second cylindrical walls of said body; and a third flange of said body extending from said base region generally parallel to said firs and second walls and adapted to engage an end of said outermost cylindrical element over a path closed upon itself and pressures said innermost cylindrical element.

7. A combination according to claim 6 wherein said third flange has a face which is inclined to form an obtuse angle with said radially extending base on the side most proximate said first flange and has a face generally perpendicular to said radially extending base on the side most remote from said first flange whereby said third flange deflects more radially to pressures imposed upon said inclined face than to pressure imposed upon said generally perpendicular face.

8. A combination according to claim 5 wherein said spring is partially embedded in said elastomer of said second flange at the innermost extremity of said flange to expose portions of the convolutions thereof adapted to engage the exterior of said outermost cylindrical elements.

9. A combination according to claim 8 wherein said inner cylindrical element is a trunnion, said outer cylindrical element is journaled on said trunnion for rotation with respect thereto, said seal is an annular body of resilient polyurethane, and said helical spring is of a metal; and including a base region of said body extending radially away from said trunnion-encompassing wall and joining said first and second walls of said body; and a third flange of said body extending from said base region generally parallel to and between said first and second walls and adapted to engage an end of said element journaled on said trunnion over a path closed upon itself and encompassing a cross section of said first wall.